(12) United States Patent
Schibinger et al.

(10) Patent No.: US 7,325,082 B1
(45) Date of Patent: Jan. 29, 2008

(54) SYSTEM AND METHOD FOR GUARANTEEING TRANSACTIONAL FAIRNESS AMONG MULTIPLE REQUESTERS

(75) Inventors: Joseph S. Schibinger, Phoenixville, PA (US); Josh D. Collier, Royersford, PA (US)

(73) Assignee: Unisys Corporation, Blue Bell, PA (US)

( * ) Notice: Subject to any disclaimer, the term of this patent is extended or adjusted under 35 U.S.C. 154(b) by 160 days.

(21) Appl. No.: 10/926,226

(22) Filed: Aug. 25, 2004

(51) Int. Cl.
G06F 13/00 (2006.01)
G06F 13/368 (2006.01)
G06F 13/372 (2006.01)

(52) U.S. Cl. .................. 710/111; 710/117; 710/124; 370/369

(58) Field of Classification Search ........... 710/111, 710/117, 124; 370/369
See application file for complete search history.

(56) References Cited

U.S. PATENT DOCUMENTS

| | | | | |
|---|---|---|---|---|
| 5,519,837 A | * | 5/1996 | Tran | 710/111 |
| 5,560,027 A | * | 9/1996 | Watson et al. | 712/12 |
| 5,640,519 A | * | 6/1997 | Langendorf et al. | 710/111 |
| 5,914,935 A | * | 6/1999 | Saito | 370/229 |
| 6,029,219 A | * | 2/2000 | Michizono et al. | 710/111 |
| 6,996,559 B1 | * | 2/2006 | Beshai | 707/6 |
| 7,158,510 B1 | * | 1/2007 | Golla et al. | 370/374 |
| 2002/0176431 A1 | * | 11/2002 | Golla et al. | 370/412 |

* cited by examiner

*Primary Examiner*—Mark H. Rinehart
*Assistant Examiner*—Jeremy S Cerullo
(74) *Attorney, Agent, or Firm*—Richard J. Gregson; Synnestvedt & Lechner, LLP

(57) ABSTRACT

A system and method for guaranteeing transactional fairness among multiple requesters contending for a common resource in a cache-coherent multiprocessor system is described. Batch processing is used to control servicing of multiple requests made by multiple requesters (such as processors) of a common resource in a cache-coherent multiprocessor system. Specifically, identification numbers are assigned to requests as they are received from the multiple requesters. The identification numbers are then used in conjunction with batch processing to prioritize and guarantee servicing of the requests.

22 Claims, 6 Drawing Sheets

SYSTEM AND METHOD FOR GUARANTEEING TRANSACTIONAL FAIRNESS AMONG MULTIPLE REQUESTERS

TECHNICAL FIELD

The present invention relates to multiprocessor systems, and more particularly, to guaranteeing fairness of transactions between multiple requesters in a cache-coherent multiprocessor system.

BACKGROUND

A multiprocessor system is typically any class of computer systems that utilizes more than one processor to execute instructions or perform operations. In most multiprocessor systems there are common resources in which the processors must rely, such as memory and input/output devices. When processors contend for such resources, the processors typically send requests to the common resource requesting that the common resource perform some type of transaction, such as performing a read operation, a write operation, or some other processing operation. Ideally, the common resource will immediately execute the requests as the requests are received. However, in most cases, the common resource will receive a large volume of requests at nearly the same time and cannot immediately process the requests.

Many approaches have been developed to attempt to solve this problem. For instance, one common solution is for the common resource to buffer all incoming requests and service them in the order they are received (or some other order depending on priority of the requests). The problem with this approach is that as the number of processors used in larger multiprocessor systems increase the number of outstanding requests also tends to increase, sometimes exponentially, making the buffer size too large, expensive, and impractical to implement for many applications.

Another common approach is to use a controller to control access to the common resource. For example, a controller, acting on behalf of the common resource, may notify certain requesters to retry their requests at a later time, because the common resource is currently unable to immediately process their requests (i.e., the common resource may be too busy or there may be a conflict). The problem with this approach is that the controller may unintentionally deny a particular transaction from continually being processed. In other words, a situation may arise in which a particular transaction, under certain circumstances, may continually get retried and cease to make forward progress, thus permanently preventing the system or a portion of the system from making forward progress, known as a "live-lock."

Most controllers designed today attempt to prevent a live-lock situation from occurring by using a protocol that guarantees fairness of multiple transactions. Often these protocols are very complicated, expensive to implement, and must be custom-designed on a system-by-system basis. Additionally, many such controllers are prone to glitches and fail to guarantee fairness of transactions between multiple requesters, inadvertently enabling a live-lock situation to occur, among other problems.

SUMMARY

To overcome the inefficiencies and problems described in the Background section, the following description introduces the broad concept of using a sliding-window (i.e., a fixed-range of identification numbers that may include one or more batches of identification numbers) to control servicing of multiple requests from multiple requesters directed to a common resource in a cache-coherent multiprocessor system. Specifically, identification numbers are assigned to requests as they are received from the multiple requesters. The identification numbers are then used in conjunction with the sliding-window to prioritize and guarantee servicing of the requests.

In one exemplary methodological implementation, identification numbers are assigned to requests made by requesters. The identification numbers are compared to a batch of identification numbers currently being serviced by a common resource. One or more of the requests can be authorized for service if the identification numbers assigned to the one or more requests are within the batch of identification numbers currently being serviced by the common resource. Otherwise requests not authorized for servicing are returned to the particular requesters that sent the requests to be retried by the particular requesters at a later time. Requests with identification numbers associated with a subsequent batch of identification numbers are generally not authorized to be serviced, until all requests with assigned identification numbers within the batch of identification numbers currently being serviced have been serviced by the common resource.

BRIEF DESCRIPTION OF THE DRAWINGS

The detailed description is explained with reference to the accompanying figures. In the figures, the left-most digit(s) of a reference number identifies the figure in which the reference number first appears.

DETAILED DESCRIPTION

Exemplary Computing Environment

Figure 1:
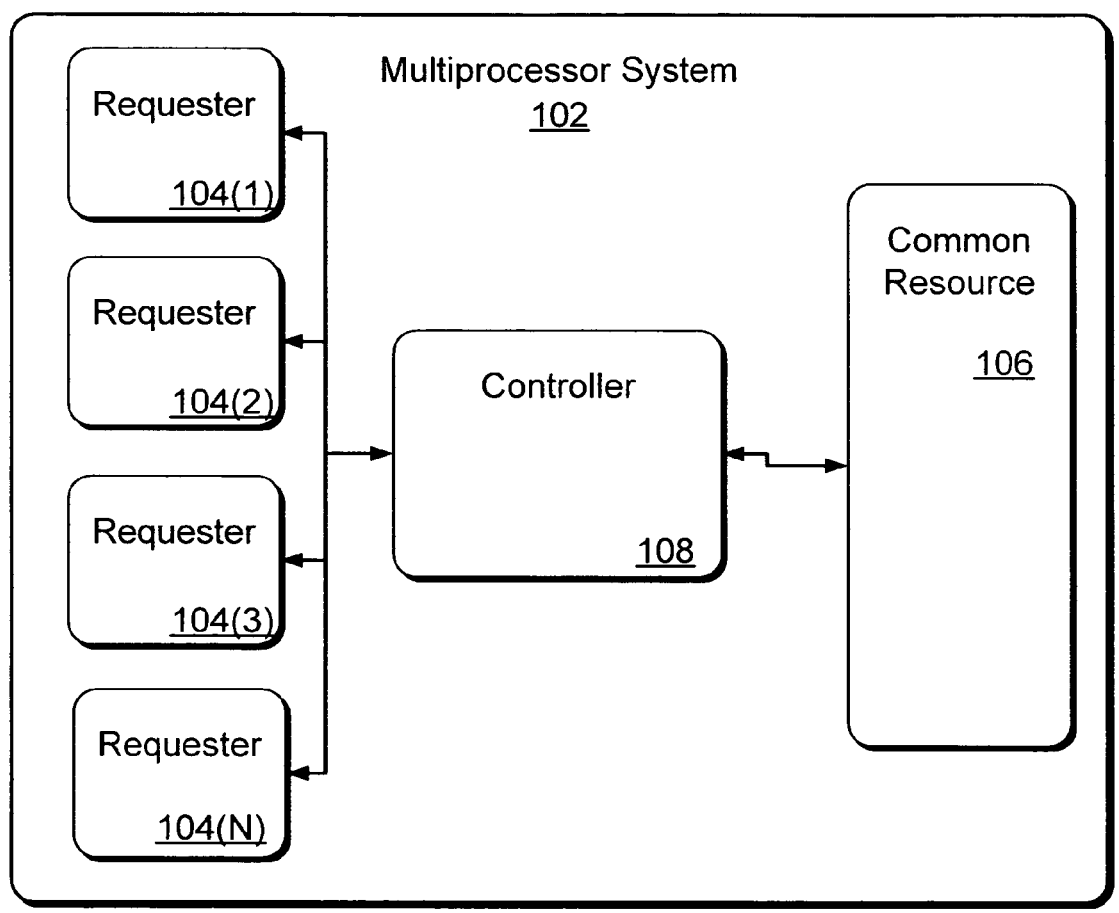
FIG. 1 illustrates an exemplary multiprocessor system in which multiple requesters are serviced by one or more common resources.

FIG. 1 illustrates an exemplary multiprocessor system 102 in which multiple requesters 104(1), 104(2) 104(3), . . . , 104(N) are serviced by one or more common resources 106. Multiprocessor system 102 generally represents any computer system that utilizes more than one processor to execute instructions or perform operations. Multiprocessor system 102 may refer to, but is not limited to, servers, routers, mainframe computers, enterprise servers, and other devices that utilize more than one processor. In one implementation, multiprocessor system 102 uses symmetrical multiprocessing in which processors are free to perform any task assigned to them, and idle processors can be added to improve performance when there are increased loads. Alternatively, in another implementation, it is possible for multiprocessor system 102 to use asymmetrical multiprocessing, in which each processor is usually assigned a fixed task.

Requesters, referred to generally as reference number 104, generally represent any entity within multiprocessor system 102 that execute various instructions to control the operation of the multiprocessor system 102 and communicate with other electronic and computing devices. For example, in one implementation, requesters represent processors, including but not limited to, proprietary processors, microprocessors, state-machines, programmable logic devices, and other processing engines.

Requesters 104 generally share one or more common resources 106. A common resource is generally a device in multiprocessor system 102 that requesters 104 rely to perform shared transactions. For instance, a common resource may represent memory, input/output devices, or other limited resources relied upon by multiple requesters. When requesters 104 contend for common resources 106, requesters typically send requests (i.e., instructions or messages) to the particular common resource requesting that the common resource perform some type of transaction, such as performing a read operation, a write operation, or various other processing operations.

A controller 108 acts as responding agent on behalf of the common resource 106 to requests received from requesters 104. That is, controller 108 is responsible for providing fair access to requests received from requesters 104 contending for common resource 106, although it is appreciated that controller 108 may have other responsibilities in a multiprocessor system 102.

Controller 108 assigns identification numbers to requests as they are received from the multiple requesters. The identification numbers are then used in conjunction with a sliding-window (i.e., a fixed-range of identification numbers that may include one or more batches of identification numbers) to prioritize and guarantee servicing of the requests. Controller 108, acting on behalf of common resource 106, may notify certain requesters to retry their requests if the common resource is unable to process their requests. Even though the requests may need to be retired at later time, the sliding-window guarantees that all requests will eventually be serviced, and hence, prevents a live-lock situation from occurring.

In one implementation, controller 108 represents a responding agent acting on behalf of memory (shown as common resource 106) in a cache-coherent multiprocessor system. "Cache coherency" means when requesters 104 access memory, controller 108, in addition to providing fair access to requests received from requesters 104, ensures that only one requester at a time is capable of writing data so that each requester 104 receives the most recent version of the data when requesting data. In other words, by participating in cache coherency each requester 104 has access to the same data, and controller 108 ensures that the most recent data is not accidentally overwritten or erased by requesters attempting to access the same data.

In another implementation, controller 108 is an I/O controller that controls the flow of data to and from I/O devices (shown as common resource 106). That is, controller 108 is used as part of an interface between I/O devices and requesters 104. In this implementation, the pertinent responsibility of controller 108 is to provide fair access to requests received from requesters 104 made to I/O devices.

Although specific examples herein may refer to controller 108 being a responding agent on behalf of either memory or I/O devices, such examples are not meant to limit the scope of the claims or the description, but are meant to provide a specific understanding of the described implementations.

It is also to be appreciated that additional components can be included in multiprocessor system 102. For example, additional processors or storage devices, additional I/O interfaces, and so forth may be included in multiprocessor system 102. It is also recognized that there are a variety of system busses, point-to-point connections, and various other connection configurations that may be used to connect the various components within multiprocessor system 102 and for purposes of this discussion any of these variety of configurations may be included.

Having introduced a computing environment, it is now possible to describe controller 108 more particularly.

System Overview From the Controller's Perspective (Responding Agent)

Figure 2A:
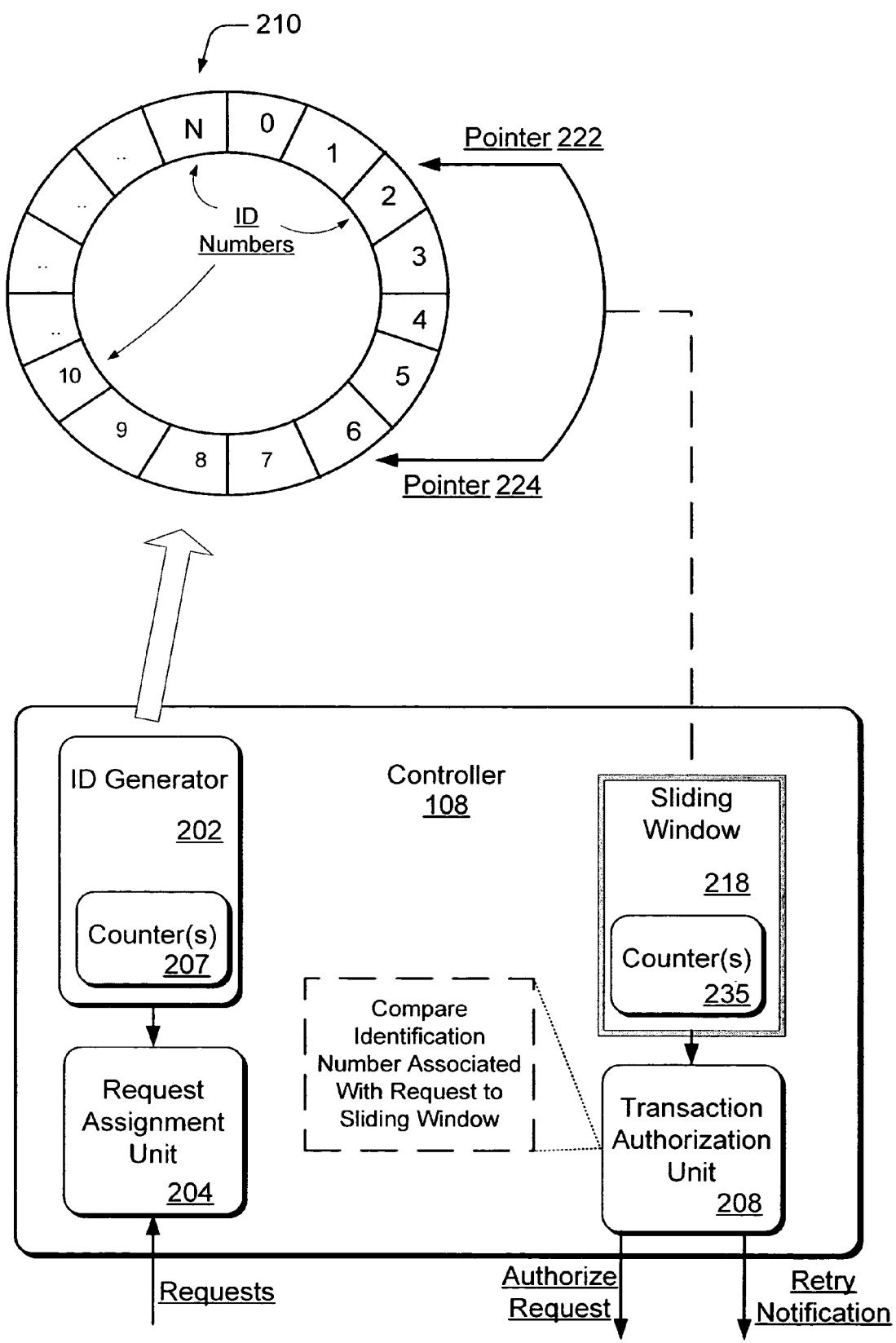
FIG. 2A is a block diagram illustrating a logical perspective of a controller.

FIG. 2A is a block diagram illustrating a logical perspective of controller 108. According to this implementation, controller 108 includes an identification generator 202, a request assignment unit 204, a sliding-window 218, and a transaction authorization unit 208.

Identification generator 202 includes one or more counters 207 configured to generate a continuous ring of identification numbers 0-to-N (referred to generally as reference number 210) in a sequential order, such as from a lowest-identification number 0 to a highest identification number N. The highest-identification number N and the lowest identification number 0 of the identification numbers are contiguous, meaning once the one or more counters 207 reach N, the one or more counters 207 reset back to zero and start counting again.

In an alternative implementation, it is possible for one or more counters to move in a counter clockwise direction starting with highest identification number N and decrement. Additionally, the one or more counters can be set to any value and do not necessarily have to start with the highest or lowest values for the one or more counters.

Alternatively, the one or more counters 207 could be replaced with a memory device having a hard-coded set of identification numbers that form a continuous ring of identification numbers 210. Accordingly, it should be well appreciated by anyone skilled in the art that the identification numbers are shown as a continuous ring of identification numbers 210 from a logical viewpoint and that the numbers can be generated by one or more counters or by other means.

Request assignment unit 204 uses the number generated by identification generator 202 to assign to new requests received from requesters 104. That is, each time a new request is received by controller 108, request assignment unit 204 reads the current identification number indicated by the one or more counters 207. Once the identification number is assigned to the new request, the one or more counters 207 are incremented. A new request means that this the first time a particular requester is sending the request and the request was not previously sent as a retry response. A retried request means the request was previously transmitted to common resource 106, but the controller 108 instructed the particular requester that issued the request to retry the request at a later time due to a conflict or another reason. Once an identification number is assigned to the request, the identification number remains associated with the request until the request is serviced by common resource 106.

Whether the request is new or retried, the identification number can be embedded in a portion (i.e., such as a header) of a particular request. It is noted that each identification number assigned to requests may include any indicia that indicates a sequence and/or priority of the request. In one implementation, an identification number may only include a number 0-to-N, which is assigned to the request in the order in which the request was received by controller 108.

Alternatively, an identification number may include additional information such as a batch number indicating that the identification number is associated with a group (i.e., batch) of identification numbers. For example, referring to FIG. 2B identification generator 202 can also use one or more counters 207 to generate a continuous ring of identification numbers 210 that are contained in batches 0-to-N in a sequential order, such as from a lowest batch number 0, to a highest batch number N. The highest batch number N and the lowest batch number 0 are contiguous, meaning once the one or more counters 207 reach N (assuming the counters are incrementing), the one or more counters 207 reset back to zero and start counting again. Each batch includes a group of identification numbers from 0-to-M, where M represents any number greater than 1. The one or more counters 207 can also generate a set of identification numbers per batch. Typically, the batch size is fixed, but it is also possible to dynamically change the batch size during operation allowing system performance to be tuned to changes in latency, number of requesters, and other systems variables. Using batch IDs tends to minimize the size of the filed that the ID occupies in a retry request and the subsequent re-issued (retried) request).

Referring back to FIG. 2A, sliding-window 218 represents a fixed-range of identification numbers 220 that advance through the continuous ring of identification numbers 210. The sliding-window 218 essentially uses two pointers 222 and 224 that are generated by one or more counters 235. Pointers 222 and 224 typically remain a fixed distance from each other and each moving an identical number of identification numbers at a time when advancing through the continuous ring of identification numbers 210. The range of identification numbers forming sliding-window 218 (the number of identification between pointers 222 and 224) are typically predetermined, but may be dynamically changed during operation allowing system performance to be tuned to changes in latency, number of requesters, and other systems variables.

Sliding-window 218 advances through continuous ring of identification numbers 210 in sequential order one or more identification numbers at a time, after at least an oldest pending request is processed by common resource 106. For example, suppose that sliding-window 218 spans five identification numbers between points 222 and 224 and sliding-window 218 is currently located between identification numbers (11) and (15), inclusively. Also, suppose that requests with assigned identification numbers (12, 13, 14, and 15) have been processed, but the request with the oldest pending identification number (11) has still not been processed by common resource 106. Sliding-window 218 cannot advance until the request with an assigned identification number of (11) is processed. Once the request with the oldest pending identification number (11) is processed, sliding-window 218 can advance by a maximum five consecutive identification numbers at a time. That is, pointer 222 will advance from identification number (11) to identification number (16) and pointer 224 will advance from identification number (15) to identification number (20).

Figure 2B:
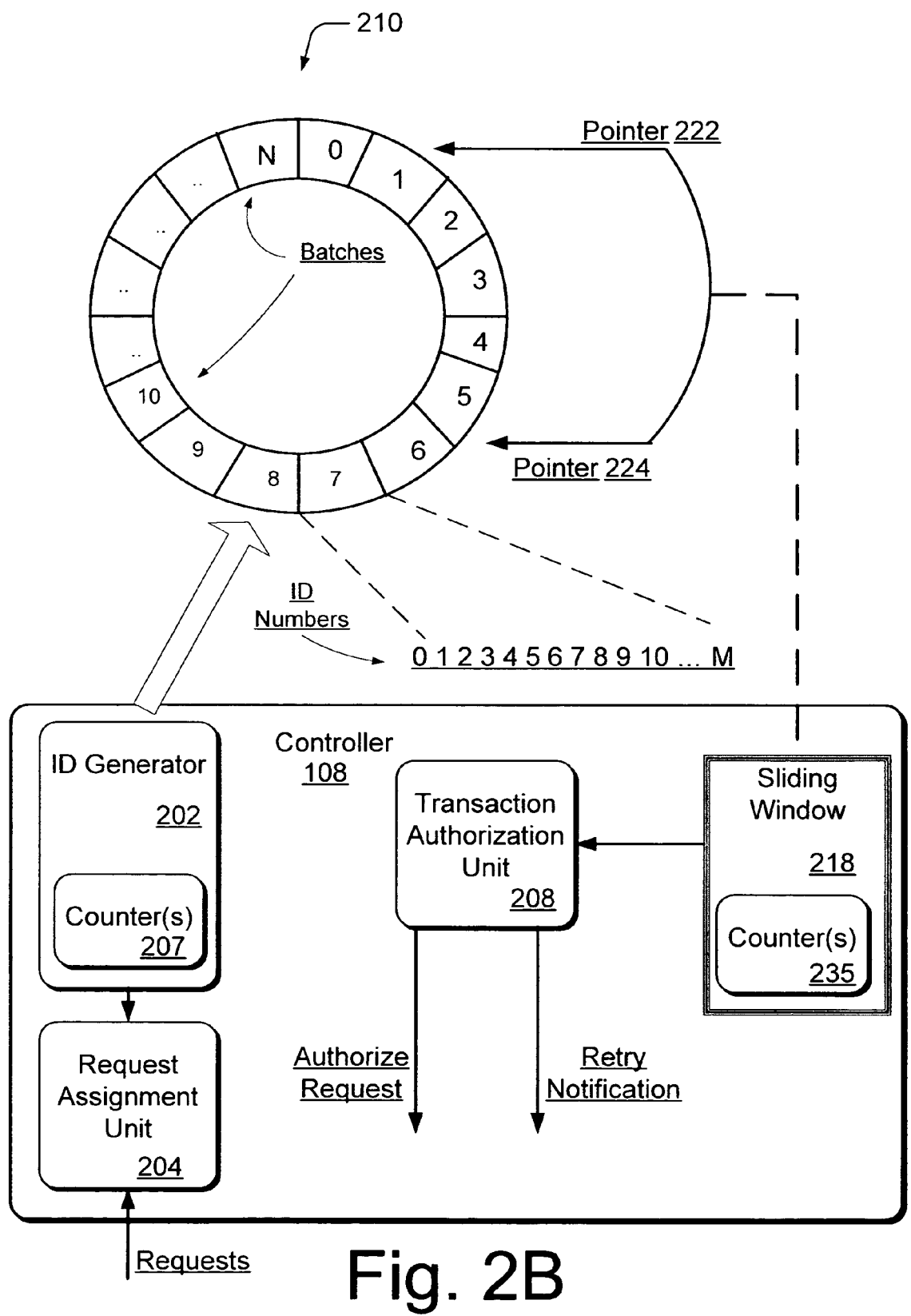
FIG. 2B shows identification numbers contained in batches.

Referring to FIG. 2B, it is noted that fixed-range of identification numbers 220 that are indicated by sliding-window 218 may include one or more batches. For instance, referring to continuous ring of identification numbers 210, sliding-window 218 advances through the continuous ring of identification numbers 210 one or more consecutive batches at a time. Allowing sliding-window 218 to span two or more consecutive batches at a time may improve performance. Nevertheless, the maximum number of consecutive batches forming sliding-window 218 is less than or equal to the maximum number of batches in the continuous ring of identification numbers 210, in order to guarantee fairness.

Referring back to FIG. 2A, transaction authorization unit 208 is configured to authorize a particular request to be serviced by common resource 106, if the identification number associated with the particular request is within the fixed-range of identification numbers indicated by sliding-window 218 (whether or not using batch processing). That is, transaction authorization unit 208 compares an identification number associated with a particular request to sliding-window 218. Transaction authorization 208 authorizes the request for servicing by common resource 106, if the identification number associated with the request falls within the fixed-range of identification numbers indicated by sliding-window 218, assuming there are no other resource or request conflicts.

On the other hand, transaction authorization unit 208 issues a retry notification to one of the requesters 104 (e.g., will instruct the requester to retry the request at a later time), if the identification number assigned to a particular request is not within the fixed-range of identification numbers indicated by the sliding-window 218. The transaction authorization unit 208 can also instruct the particular requester to retry the request if there is a conflict associated with servicing the request, even if the identification number is within the sliding-window 218. When issuing a retry notification, transaction authorization unit 208 will typically send a retry notification message that includes the identification number assigned to the request. That way, the both the requester 104 and controller 108 can keep track of the particular request for purposes of adhering to the controller's requirements. Thus, transaction authorization unit 208 is responsible for authorizing whether a request (whether new or retried) is processed by common resource 108.

Referring to FIG. 2B, when sliding-window 218 is implemented to encompass one or more batches, transaction authorization unit 208 compares the identification number assigned to a request to a batch of identification numbers currently being serviced by common resource 106. Transaction authorization unit 208 will authorize a request to be serviced by the common resource 106 (FIG. 1), if the identification number assigned to the request is associated with batch number currently being authorized for service by transaction authorization unit 208. For example, suppose Batch 1 is currently being serviced and a request with an assigned identification number of (10) from Batch 1 is received. Assuming there are no other conflicts, transaction authorization unit 208 will authorize the request to be serviced by the common resource 106. However, if the request has an assigned identification number of (10), but is from batch 50, transaction authorization unit 208 will issue a retry notification to the particular requester, which issued the request if sliding-window does not encompass batch 50.

With reference to FIGS. 2A and 2B, any requests with associated identification numbers that have been serviced can be reassigned to incoming requests, once the sliding-window advances past the particular identification number. Ideally, there will always be enough identification numbers available to be assigned to incoming requests. This can be accomplished by limiting the number of pending requests at any one time or by sending an automatic retry request (without and ID) if no identification numbers are available to be assigned. It is noted, however, that sending an automatic retry request does not necessarily guarantee fairness.

Although controller 108 has been described as including identification generator 202, request assignment unit 204, sliding-window 218, and transaction authorization unit 208, it is appreciated that each of these elements are generally illustrated from a logical point of view, and can be realized in any form of hardware, firmware, software, and any combination thereof.

Figure 3:
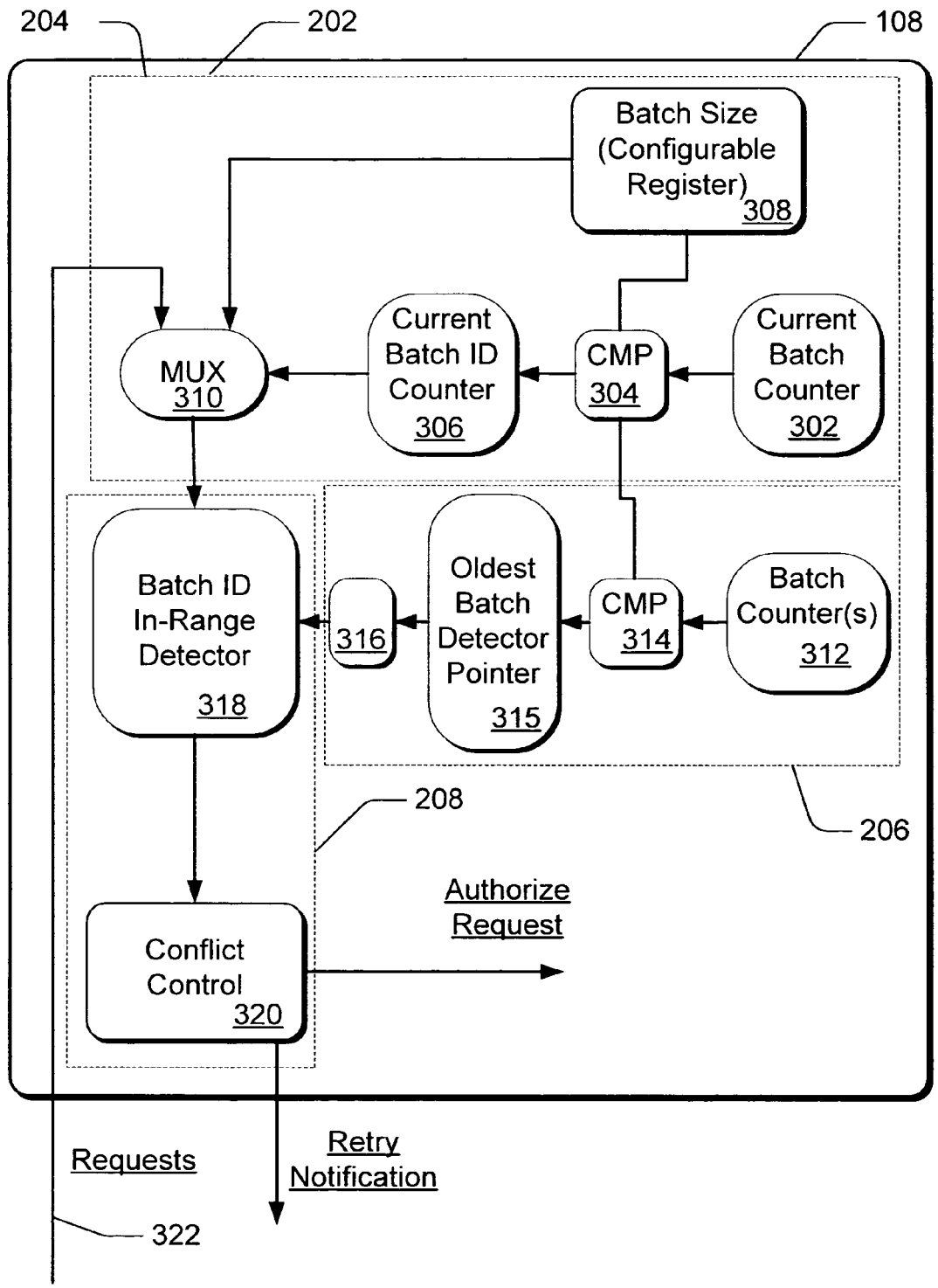
FIG. 3 is a block diagram of the controller showing how select elements from FIGS. 2A and 2B can be implemented according to another exemplary implementation.

FIG. 3 is a block diagram of the controller showing how select elements from FIGS. 2A and 2B can be implemented according to another exemplary implementation. For instance, in one embodiment, identification generator 202 and request assignment unit 204 include a current batch counter 302, a comparator 304 a current batch ID counter 306, and some type of selection circuitry, such as a multiplexer (MUX) 310. Sliding-window 218 includes one or more batch counters 312, compare logic 314, an oldest batch detector pointer 315, and one or more batch ID counters 316. Transaction authorization unit 208 includes a bath ID in-range detector 318 as well as a conflict controller 320. As appreciated by those skilled in the art, each of these devices can be implemented through the use of programmable logic, hardware, circuitry, firmware, software or any combination thereof. Those skilled in the art should also appreciate that there are numerous ways to implement any one of these elements and that FIG. 3 is illustrated for discussion purposes and is not meant to limit the scope of the claims.

In operation, controller 108 receives a stream of requests from requesters 104 via line 322. Each request travels to MUX 310 and controls whether an identification number is assigned to the request, or if the request is a retry request. If the request is a retry request it will already have an identification number assigned to it and can immediately pass through MUX 310 to transaction authorization unit 208 to determine whether the identification number is within a sliding-window as indicated by sliding-window 218.

If the request is a new, MUX 310 will select a new identification number generated by current batch counter 302 and current batch ID counter 306. Current batch counter 302 generates a batch identification number. A batch size register 308, which in one embodiment is programmable, indicates the size of a current batch. Current batch ID counter 306 generates an identification number for the current batch indicated by batch counter 302. Compare logic 304 compares batch size register 308 to batch counter 302 to determine when to advance current batch ID counter 306 and reset batch counter 302.

Once a request (whether new or retried) passes through MUX 310, batch ID in-range detector 318, checks whether the identification number associated with the request falls within a sliding-window (such as a fixed-range of identification numbers that may include one or more batches) indicated by the one or more batch ID counters 316. If batch ID in-range detector 318 determines that the identification number is not within the sliding-window, batch ID in-range detector 318 notifies conflict controller 320. In response to the notification, conflict controller 320 issues a retry response to the requester that issued the request.

If batch ID in-range detector 318 determines that the identification number is within the sliding-window, batch ID in range-detector 318 notifies conflict controller 320 indicating that the request is authorized for servicing. In response to the notification, conflict controller 320 will authorize the request by sending a service authorization signal (or the particular request) to common resource 106. Even though batch ID in-range detector 318 indicates that a particular request is authorized for servicing, conflict controller 320 may still issue a retry response to requesters, if there is a resource or request conflict associated with the request from another portion of multiprocessor system 102.

Finally, the one or more batch counters 312 enable oldest batch detector pointer 315 to determine an oldest pending batch. Each time a request is authorized the corresponding batch counter is incremented and is compared to the batch size. If the batch counter reaches the batch size and the batch is the oldest batch (indicated by the oldest batch detector pointer 315), then the sliding window pointers are incremented. It is also possible for the one or more batch counters 312 enable oldest batch detector pointer 315 to track whether a batch has been leapfrogged to become an oldest pending batch currently being serviced by sliding-window 218. It is noted that any non-counting devices described above with reference to FIG. 3, such as batch ID in-range detector 318 and oldest batch detector pointer 315, can be implemented using rudimentary control logic circuitry. In most instances, these devices are composed of one or more comparators. As for conflict controller 320, again this device uses rudimentary control logic, which can include control logic and minimal state circuitry.

In alternative embodiment, a majority of the counters (allocation—not de-allocation counters) described with reference to FIG. 3 can be replaced with a single counter, where the most significant bits generated by the counter (or most significant portion of the counter) is used as the batch indicator and the rest of the bits generated by the counter identify the identification number within the batch.

Thus, implementing a controller 108 that uses a sliding-window as described herein is simple and inexpensive, requiring minimal counters, control logic, and minimal buffering. Such a controller can easily be adapted to function on a broad range of multiprocessor systems without having to redesign custom protocols and controllers on a system-by-system basis.

Requesters

Figure 4:
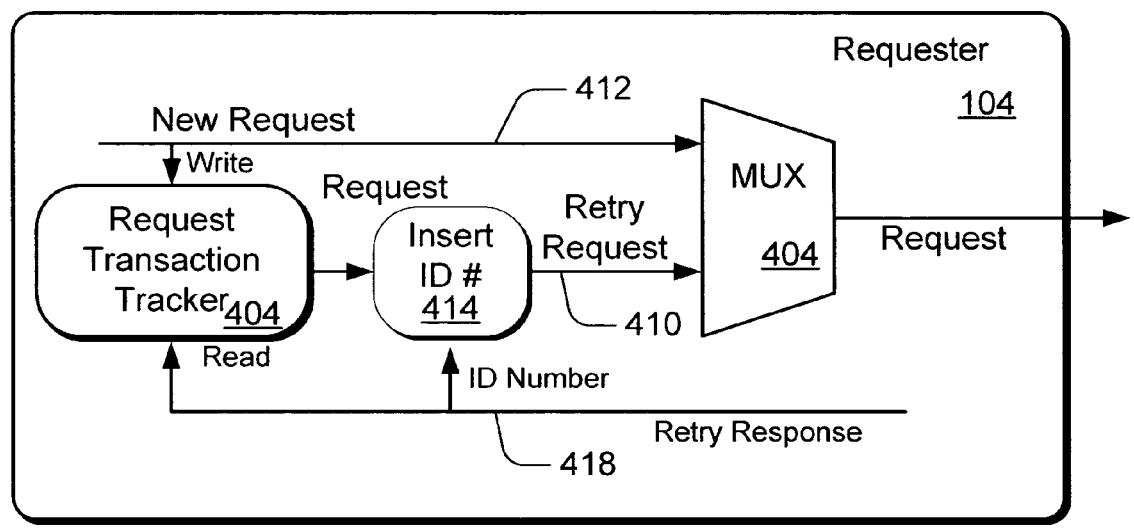
FIG. 4 shows select elements of a requester.

FIG. 4 shows select elements of a requester 104 according to one exemplary implementation. Typically, each requester includes a core processor (not shown) that generates new requests. Before each new request is transmitted to common resource 106 (FIG. 1), the new request is written into a request transaction tracker 402. Request transaction tracker 402 is a register that stores all pending requests until they are eventually serviced by common resource 106 at which time information associated with the request in request tracker 402 can be over-written.

A new request exits requester 104 via path 412 of MUX 404. If the request is retried, a retry response is returned to requester 104 via path 418. The retry response includes the identification number assigned to the request. The identification number is written into a register 414.

The retry response also serves as a read index to request transaction tracker 402, which causes request transaction tracker 402 to read out the request stored in request transaction tracker 402 associated with the retry response. After the request is read from request transaction tracker 402, the identification associated with the request in register 414 is inserted into the request. Then at some time thereafter, a retried request is sent via path 410 through MUX 404 to common resource 104.

Methods of Operation

Figure 5:
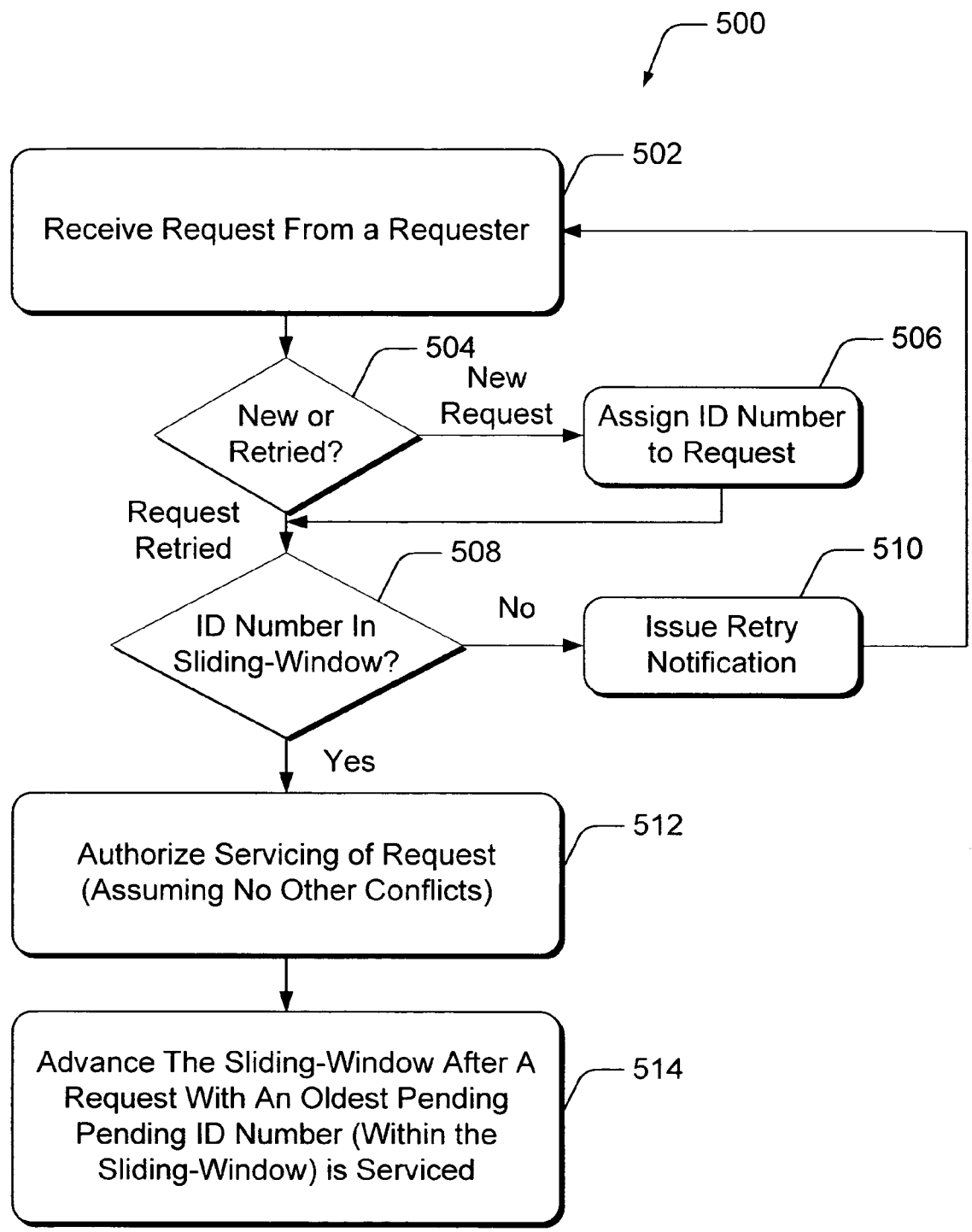
FIG. 5 illustrates a method for guaranteeing fairness of transactions between multiple requestors in a multiprocessor system.

FIG. 5 illustrates a method 500 for guaranteeing fairness of transactions between multiple requesters in a multiprocessor system. Method 500 includes blocks 502-514. The order in which the method is described is not intended to be construed as a limitation, and any number of the described method blocks can be combined in any order to implement the method.

In block 502, a request is received from a particular requester. For example, controller 108 (FIGS. 1 and 2) receives a request from a requester 104 (FIGS. 1, 2 and 3).

In decisional block 504, a decision is made whether the request is new or retried. If according to the Yes branch of decisional block 504 the request is new, method 500 proceeds to block 506. If according to the No branch of decisional block 504 the request is retried then the request already has an identification number assigned to it indicating that the request was previously received, and method 500 then proceeds to block 508.

In block 506, if the request was new, an identification number is assigned to the request. For example, request assignment unit 204 (FIG. 2) assigns an identification number generated by identification generator 202 (FIG. 2).

In a decisional block 508, a determination is made whether the identification number is within a sliding-window. For example, the identification number is compared to sliding-window 218 (FIG. 2) to determine if the identification number is within the range of sliding-window 218 (FIG. 2). If according to the Yes branch of decisional block 508, the number is within the sliding-window, method 500 proceeds to block 512. If according to the No branch of decisional block 508, the number is not within the sliding-window, method 500 proceeds to block 510.

In block 510, the request is not authorized for servicing and a retry notification is issued to the requester that sent the request, if the identification number associated with this request is not within the sliding-window. For example, transaction authorization unit 208 will instruct the requester that issued the request to resend that request at a later time.

In block 512, the request is authorized for servicing, if the identification number associated with this request is within the sliding-window. For example, transaction authorization unit 208 enables the request to be serviced (assuming no other conflicts) if the request has an identification number that falls within sliding-window 218.

In block 514, the sliding-window is advanced once a request, with an oldest pending assigned identification number within in the sliding-window, is enabled for service. For example, sliding-window 218 advances one or more identification numbers at a time, once an oldest pending request is serviced by common resource 106 (FIG. 1). This includes enabling an oldest-pending request in an oldest pending batch as described above with reference to FIG. 2.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A system for guaranteeing fairness of transactions between multiple requestors, comprising:
    an identification generator configured to generate a continuous ring of batch numbers in a sequential order from a lowest-batch number to a highest-batch number, wherein the highest batch number and the lowest batch number of the batch numbers are contiguous;
    a request assignment unit configured to assign identification numbers to requests made by the requesters;
    a sliding-window comprising a fixed-range of the identification numbers configured to advance through the continuous ring of identification numbers in sequential order one or more identification numbers at a time, after at least one of an oldest pending request, having an identification number within the fixed-range of identification numbers, is serviced; and
    a transaction authorization unit, configured to authorize a particular request be serviced if the identification number associated with the particular request is within the fixed-range of identification numbers indicated by the sliding-window;
    wherein the fixed-range of batch number indicated by the sliding-window equals one or more batches each comprising a predetermined plurality of identification numbers.

2. The system as recited in claim 1, wherein the transaction authorization unit is further configured to issue a retry notification to one of the requesters, if a particular identification number assigned to a particular request is not within the fixed-range of identification numbers indicated by the sliding-window.

3. The system as recited in claim 1, wherein the identification generator comprises one or more counters.

4. The system as recited in claim 1, wherein the sliding-window comprises one or more counters.

5. A method for guaranteeing transactional fairness among multiple requesters, comprising:
    receiving a request from a particular requester;
    assigning a batch number and an identification number to the request if the request is new, wherein if the request is retried the request already comprises an assigned batch number and an assigned identification number indicating that the request was previously received before;
    determining whether the identification number is within a sliding-window;
    enabling the request to be serviced, if the identification number is within the sliding-window for servicing the request and there are no conflicts associated with servicing the request; and
    advancing the sliding-window after an oldest pending request with a assigned identification number in the sliding-window is enabled for service
    wherein
    a continuous ring of batch numbers in a sequential order from a lowest-batch number to a highest-batch number, wherein the highest-batch number and the lowest batch number of the batch numbers are contiguous; and
    the fixed-range of batch number indicated by the sliding-window equals one or more batches each comprising a predetermined plurality of identification numbers.

6. The method as recited in claim 5, further comprising instructing the particular requester to retry the request at a later time if the identification number associated with the request is not within the sliding-window.

7. The method as recited in claim 5, further comprising instructing the particular requester to retry the request, if there is a conflict associated with servicing the request.

8. The method as recited in claim 5, wherein the sliding-window comprises a fixed-number of identification numbers.

9. The method as recited in claim 5, wherein the sliding-window comprises one or more batches each comprising a fixed-number of identification numbers.

10. The method as recited in claim 5, further comprising instructing the particular requester to retry the request at a later time if the identification number associated with the request is not within the sliding-window, wherein instructing the particular requester to retry the request comprises issuing a retry notification message to the particular requester, the retry notification message comprising the identification number assigned to the request.

11. The method as recited in claim 5, wherein the method is performed by a control system associated with a cache-coherent system.

12. The method as recited in claim 5, wherein the method is performed by a control system associated with an input/output device.

13. The method as recited in claim 5, wherein each requester is an agent in a multiple agent system.

14. The method as recited in claim 5, wherein each requester is a processor in a multiple processor system.

15. The method as recited in claim 5, wherein each request is a request to perform a particular transaction.

16. The method as recited in claim 5, wherein determining whether the identification number is within a sliding-window for servicing the request comprises comparing the identification number to a range of identification numbers associated with the sliding-window to determine whether the identification number associated with the request is between the range of identification numbers associated with the sliding-window.

17. In a cache-coherent multiprocessor system, a coherency controller for preventing live locks by guaranteeing fairness of transactions between multiple requestors, the coherency controller comprising:
an identification generator configured to generate a continuous ring of batch numbers in a sequential order from a lowest batch number to a highest-batch number, wherein the highest batch number and the lowest batch number of the batch numbers are contiguous;
a request assignment unit configured to assign identification numbers to requests made by the requesters;
a sliding-window comprising a fixed-range of the identification numbers configured to advance through the continuous ring of identification numbers in sequential order one or more identification numbers at a time, after at least one of an oldest pending request, having an identification number within the fixed-range of identification numbers, is serviced; and
a transaction authorization unit, configured to authorize a particular request be serviced if the identification number associated with the particular request is within the fixed-range of identification numbers indicated by the sliding-window;
wherein the fixed-range of batch number indicated by the sliding-window equals one or more batches each comprising a predetermined plurality of identification numbers.

18. In a multiprocessor system, a system for preventing live locks by guaranteeing fairness of transactions, the system comprising:
requesting agents configured to send requests to a responding agent, each request agent identifies whether the request is a new request or a retried request, wherein if the request is retried the request already comprises an assigned identification number indicating that the request was previously made by the requesting agent;
a responding agent, configured to:
(i) receive a request from a particular requester and assign an a batch number and an identification number to the request if the request is new, wherein if the request is retried the request already comprises an assigned batch number and an assigned identification number indicating that the request was previously received before,
(ii) determine whether the identification number is within a sliding-window of identification numbers currently being serviced;
(iii) enable the request to be serviced, if the identification number is within the sliding-window of identification numbers and there are no conflicts associated with servicing the request; and
(iv) advance the sliding-window only after an oldest pending request with an assigned identification number within the sliding-window is enabled for service
wherein
a continuous ring of batch numbers in a sequential order from a lowest-batch number to a highest-batch number, wherein the highest-batch number and the lowest batch number of the batch numbers are contiguous; and
the fixed-range of batch number indicated by the sliding-window equals one or more batches each comprising a predetermined plurality of identification numbers.

19. The system as recited in claim 18, wherein the responding agent is further configured to notify the particular requester to retry the request at a later time if the identification number associated with the request is not within the sliding-window.

20. The system as recited in claim 18, wherein the sliding-window comprises a fixed number of identification numbers.

21. The system as recited in claim 18, wherein the sliding-window comprises one or more batches each comprising a fixed-number of identification numbers.

22. The system as recited in claim 18, wherein the responding agent comprises a counter configured to generate an of identification number for assignment to a new request each time a new request is received.

* * * * *